(12) United States Patent
Klabisch et al.

(10) Patent No.: US 6,708,817 B2
(45) Date of Patent: Mar. 23, 2004

(54) DRIVE AND TENSIONING STATION OF A CHAIN SCRAPER CONVEYOR

(75) Inventors: Adam Klabisch, Dortmund (DE); Gerhard Merten, Lunen (DE); Hans Meya, Werne (DE)

(73) Assignee: DBT GmbH (DE)

( * ) Notice: Subject to any disclaimer, the term of this patent is extended or adjusted under 35 U.S.C. 154(b) by 0 days.

(21) Appl. No.: 09/974,948

(22) Filed: Oct. 11, 2001

(65) Prior Publication Data

US 2002/0074214 A1 Jun. 20, 2002

(51) Int. Cl.$^7$ ............................................. B65G 23/44
(52) U.S. Cl. ........................................ 198/813; 198/498
(58) Field of Search ............................. 198/494, 498, 198/499, 813

(56) References Cited

U.S. PATENT DOCUMENTS

| | | | | |
|---|---|---|---|---|
| 4,284,192 A | * | 8/1981 | Taylor | 198/813 |
| 4,657,131 A | * | 4/1987 | Brychta et al. | 198/810 |
| 5,421,448 A | * | 6/1995 | Falcioni | 198/498 |
| 5,579,896 A | * | 12/1996 | Braun et al. | 198/728 |
| 5,641,058 A | * | 6/1997 | Merten et al. | 198/810.04 |
| 6,029,799 A | * | 2/2000 | Weigel et al. | 198/810.04 |
| 6,321,900 B1 | * | 11/2001 | Micklethwaite | 198/498 |

FOREIGN PATENT DOCUMENTS

| | | |
|---|---|---|
| DE | 2 061 387 | 12/1970 |
| DE | 28 47 565 A1 | 5/1980 |
| DE | 28 41 000 A1 | 10/1980 |
| DE | 3421993 A1 | 10/1985 |
| DE | 196 16 458 A1 | 10/1997 |

OTHER PUBLICATIONS

Operational Experience with a Telescopic Ramp Pan –Dipl. Ing. Gunter Reisner –Gluckauf (Mining Journal) (1986) Nr. 5.

* cited by examiner

Primary Examiner—Christopher P. Ellis
Assistant Examiner—Rashmi Sharma
(74) Attorney, Agent, or Firm—Cook, Alex, McFarron, Manzo, Cummings & Mehler, Ltd.

(57) ABSTRACT

A drive and tensioning station (10) of a chain scraper conveyor for mining operations with a machine frame base (20) having side cheeks (21) and a conveyor base (22), connected to a line of pans of the chain scraper conveyor, with a tensioning frame head (50) which can be moved in the direction of the line of pans, in whose side cheek plates (51) can be mounted the chain drum (3) for the scraper chain, and with a tensioning drive having at least one tensioning cylinder (6) to move the tensioning frame head (50) relative to the machine frame base (20). The tensioning frame head (50) has a box-like drawer (60) extending out over the side cheek plates (51) toward the pan connecting side, which is guided in a type of drawer guide (26) on the machine frame base (20) and that on the tensioning frame head (50) a top run pan (70) forming a drag plate in the top run (4) and/or a bottom run box (40) forming a drag base in the bottom run are removably fastened.

16 Claims, 3 Drawing Sheets

DRIVE AND TENSIONING STATION OF A CHAIN SCRAPER CONVEYOR

The present invention relates to a drive and tensioning station of a chain scraper conveyor for mining operations with a machine frame base having side cheeks and a conveyor base, connected to a line of pans of the chain scraper conveyor, with a tensioning frame head which can be moved in the direction of the line of pans, in whose side cheek plates can be mounted the chain drum for the scraper chain, and with a tensioning drive having at least one tensioning cylinder to move the tensioning frame head relative to the machine frame base.

A drive and tensioning station of this construction is proposed in DE 39 23 320 A1. The previously proposed drive station has side cheeks, which are joined via cross beams to a rigid machine frame. The side cheeks extend essentially over the entire length of the drive station and have window-like cut-outs, in which bearing cheek plates are taken onto which the chain drum for the scraper chain is mounted. In order to provide a clean run of the tensioning cradle retained in the bearing cheek plates in the machine frame, guide rails are arranged at a distance from each other above and below the cut-out, which have hooks protruding outwards and upwards and downwards. The bearing cheek plates taken into the cut-out, which are penetrated by the chain drum shaft, are firmly joined with flange plates, onto which the conveyor drive can be flanged. The flange plates have claw shaped guide attachments above and below complementing the guide rails, which engage the guide rails in the manner of hooks. The combination of bearing cheeks and flange plates provided with guide attachments caters for a positive guidance of the tensioning frame head in the tensioning direction, or the opposite direction from the conveyor chain, the construction is however overall relatively expensive. In order to obtain a large tensioning path for the scraper chain, the scraper chain tensioning cylinders are supported at one end on a cross beam of the tensioning cradle and at their other ends on a connection pan, which in a well known manner, forms the transition between the drive station and the line of pans. The tensioning cylinders thus overlap the abutment or impacting position between the drive station and the connection pan. The tensioning cylinders of the tensioning drive for the scraper chain lie here between the side cheeks of the machine frame of the drive station.

It is an aim of the present invention to produce a drive and tensioning station with a simplified construction, which can be disassembled comparatively quickly and whose parts which are liable to wear can be exchanged in a simple manner.

Accordingly the present invention is directed to a drive and tensioning station as set out in the opening paragraph of the present specification, in which the tensioning frame head has a box-like drawer extending out over the side cheek plates toward the pan connection side, which is guided in a type of drawer guide on the machine frame base and in which on the tensioning frame head a top run pan forming a drag plate in the top run and/or a bottom run box forming a drag base in the bottom run is/are removably fastened.

In comparison with the prior art the drawer like guidance of the tensioning frame head within the stationary machine frame base ensures a significant saving of material and weight, since side cheeks which extend over the entire length of the drive station can be dispensed with. The depth of the machine frame base and the length of the drawer together with the lifting height determine the possible tensioning path. For the drawer guidance it can especially be exploited that in drive and tensioning stations a relatively large height difference exists between the top run and the bottom run, in order to guide the scraper and the scraper chain essentially tangential to the chain sprocket of the chain drum shaft. This height difference offers sufficient space for a powerful, stable and secure guidance of the tensioning frame head in the machine frame base. The drawer guide lies between the side cheeks of the machine frame base and is therefore largely protected against the ingress of conveyed material. Since the box-like guide drawer is positioned behind the side cheek plates of the tensioning frame head in the tensioning direction, it is possible at the same time to fasten a wear-prone drag plate or a wear-pone drag base removably to the side cheek plates or to the tensioning frame head in a relatively simple manner, whereby the connecting positions between the drag plate or base and the tensioning frame head are easily accessible by pushing out the tensioning frame head by a few centimeters, so that the top run pan and the bottom run box can possibly be quickly exchanged if too greatly worn.

The exchange of the top run pan and of the bottom run box is simple if the side cheek plates of the tensioning frame head are provided in each case with at least two connecting eyes on their front sides on the pan connection side, onto which the top run pan and the bottom run box are removeably fastened by means of push-in or screw pins. Preferably the pins are secured by means of substantially U-shaped push-in staples on or in the connecting eyes.

Advantageously the drawer guide includes several exchangeably fastened U-shaped angle irons fastened in the side cheeks of the machine frame base, whereby the inner surfaces of the angle irons form the guides for sliding the drawer and the upper surfaces of the webs of the angle irons support for the top run pan. By the use of several U-shaped angle irons with comparatively small abutment zones for the drawer and the upper drag plate the frictional forces between the parts which move against each other and are guided in each other can be reduced. Possibly again the feasibility is offered of exchanging the angle irons in the event of too great wear on them. Furthermore the drawer guide can have a closed upper cover forming the conveyor base and a lower cover preferably provided with openings for passage of fine grain material.

Especially the top run pan has a pan base and side profiles, on whose inner profile surfaces the scrapers of the chain scraper are guided, so that the top run pan caters for an extension of the top run and the material conveyed with the chain scraper conveyor, for instance coal, is taken independently of the tension setting, in a channel enclosed at the sides and below, up to the chain drum shaft. Advantageously the side cheeks of the machine frame base are provided with upper horizontal longitudinal rails, which form an upper guide for the top run pan and its side profiles. With these measures horizontal guidance is assured for the top run pan in the top run and vertical tilting of the top run pan is prevented, although the top run pan itself is only joined at, for instance, two fastening positions to the tensioning frame head. In a preferred embodiment the conveyor base of the machine frame base is provided on the pan connection side with a tongue-shaped cover plate, cut to size, and the top run pan has a corresponding tongue-shaped cut-out, whereby the edges of the plate and the cut-out are provided with a ramp-like incline. The incline on the edges of the plate and the cut-out come into effect when the tensioning frame head is retracted into the machine frame base, since the conveyed material, which when the top run pan is completely extended, collects in zones which lie deeper than the actual conveyor base level, can be forced upwards by the ramp effect of the inclines, whilst the yielding movement of the tensioning frame head is not hindered by conveyed material such as coal dust.

Preferably the bottom run box has an upper covering plate provided with openings for the passage of fine grain material. It is understood that then the openings in the upper covering plate of the bottom run box must work together with the openings in the lower covering plate of the drawer-like guide, so that any conveyed material which may inadvertently be taken into the drawer guide can escape out of the hollow drawer guide. Especially the openings in the cover plate have a greater extension in the direction of movement than the openings in the lower cover of the drawer guide, or vice versa, so that in no position in the movement of the tensioning frame head relative to the machine frame base are the openings fully closed. It is expedient here also if the bottom run box has a tongue shaped cut-out on the pan connecting side, whose edges preferably are provided with an incline. In a preferred embodiment the tongue-shaped cut-outs in the top run pan and/or in the bottom run box extend over more than the maximum tensioning distance, so that the scrapers taken in the top run and in the bottom run and moving along do not run over the inclines on the edges of the cutouts, and can therefore run evenly through the drive station.

For twist-free movement of the tensioning frame head relative to the machine frame base, at least one tensioning cylinder is linked on each side to the side cheek plate of the machine frame base at one end and at the other end to the side cheek plate of the tensioning frame head, whereby two tensioning cylinders are arranged preferably at the same height level as the drawer guide, or four tensioning cylinders are arranged symmetrically to the drawer guide. Preferably flange plates are arranged outside on the side cheek plates, possibly with the interposition of intermediate plates onto which a drive set for the conveyor can be fastened, whereby the connecting plates for fastening the tensioning cylinders to the tensioning frame head are supported on the flange plate, on the side cheek plates and possibly on the intermediate plates.

An example of a drive and tensioning station made in accordance with the present invention will be described hereinbelow with reference to the accompanying drawings, in which.

Figure 1:
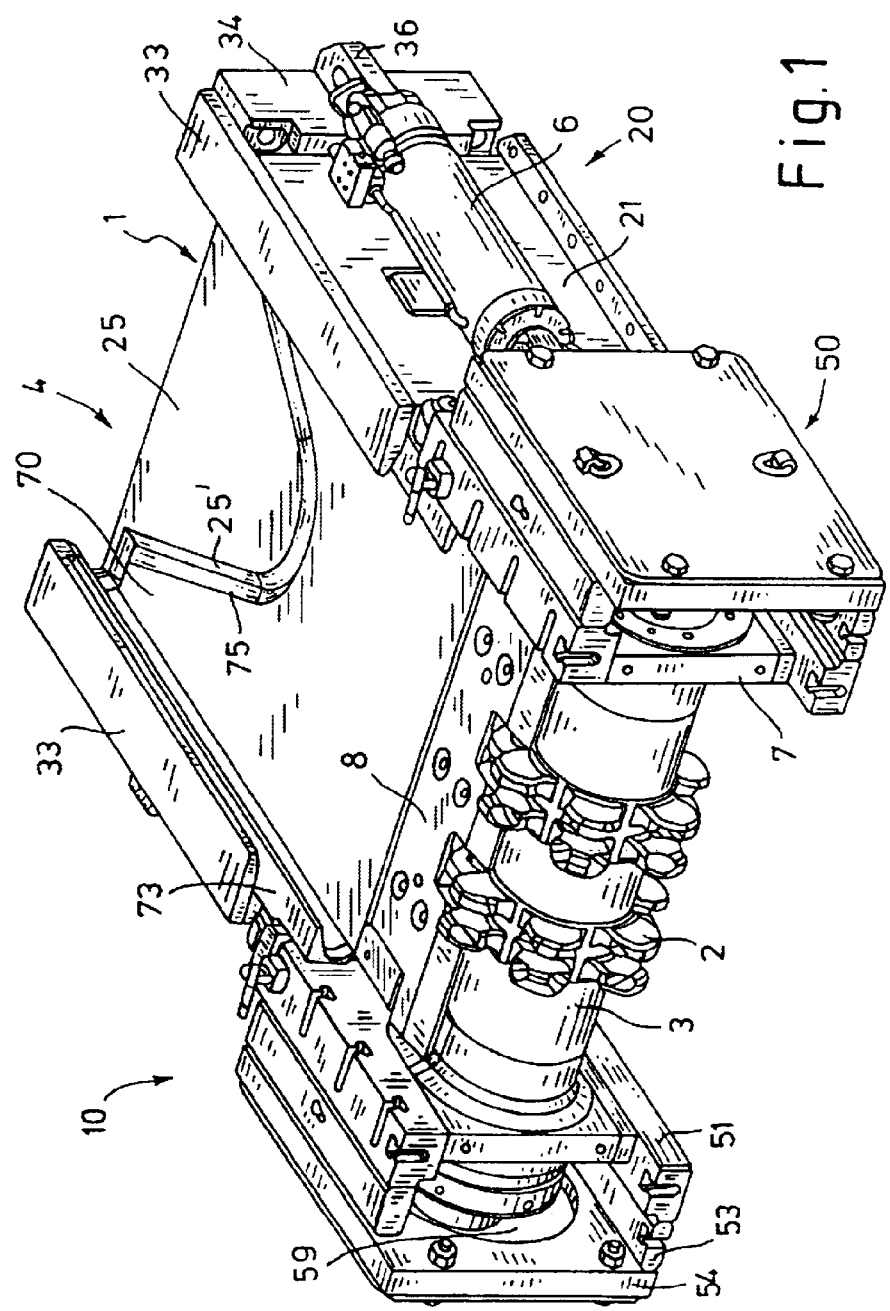
FIG. 1 shows a perspective view of a drive and tensioning station according to the invention, with chain drum shaft assembled.

The drive and tensioning station 10 shown in FIG. 1 forms the head end of a chain scraper conveyor, not shown further, as for instance of a face conveyor in underground extraction operations. The construction of a chain scraper conveyor, in which several conveyor pans are put together into a line of pans, is known, so that a more detailed description is omitted here. The drive and tensioning station 10 is joined at the pan connecting end 1 at the back in FIG. 1 to a connecting channel which transfers the conveyor base from a lower lying level in the line of pans to a higher lying level in the drive station 10, so that scrapers, not shown, running in the line of pans and the scraper chain, not shown, are led onwards tangentially to the chain sprocket 2 of the chain drum 3, guided around and transferred into the return run (bottom run). The drive and tensioning station 10 is constructed as a tensioning frame and has a machine frame base 20, stationary as a rule, and a tensioning frame head 50 which is movable relative to the machine frame base 20. The machine frame base 20 is shown in FIG. 2, the tensioning frame head 50 in FIG. 3.

Figure 2:
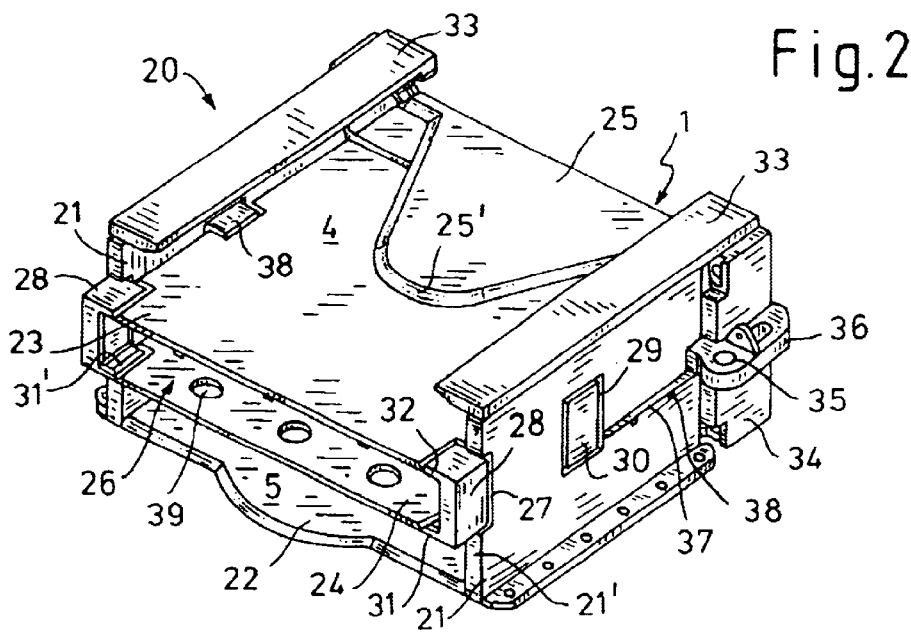
FIG. 2 shows a perspective view of a machine frame base.

As FIG. 2 shows, the machine frame base 20 has two vertical side cheeks 21, constructed as mirror images of each other, which are stiffened by means of a base plate 22, an upper cover 23 and a lower cover 24, a covering plate 25 as well as possibly cross beams, not shown, at the channel connection end, into a machine frame. The upper cover 23 and the lower cover 24 together with the side cheeks 21 border a drawer-like guide 26, which is arranged somewhat at the middle height level of the machine frame base 20 and forms a box-shaped hollow space between the top run 4 and the bottom run 5 of the chain scraper conveyor. The closed upper cover 23 of the guide 26 at the same time forms a part of the conveyor base in the top run 4, whilst the base plate 22 forms the base for the bottom run 5, in which the scrapers and the scraper chain return to a further drive station. In the forward head front end side 21' of the side cheeks 21 in FIG. 2 essentially central edge cut-outs 27 are provided, in which an angle iron 28 with an essentially U-profile is in each case fastened possibly so that they can be exchanged or welded in. At the same height, displaced toward the channel connection end 1 the side cheeks 21 have a window 29, in which a further angle iron 30 with a U-profile is fastened. The lower horizontal webs 31 and the upper horizontal webs 32, 38 of the angle irons 28, 30 lie essentially at the same height as the upper cover 23 and the lower cover 24, whereby the lower webs 31 are provided with abutment faces 31' which indeed extend out over the plate level of the lower cover 24. To a similar degree the upper side of the upper webs 32, 38 in each case extends out over the upper cover 23 of the drawer-like guide 26. The upper ends of the side cheeks 21 are formed by horizontal longitudinal rails 33, which overlap the top run 4 at its side edges.

From FIG. 2 it can further be seen that close to the channel connection side end 1 vertical webs 34 are provided onto which, somewhat centrally, connecting plates 36 are fastened, especially welded, provided with an eye bolt 35 for pivoting on the rear ends of the tensioning cylinders 6 (FIG. 1). It can further be seen that the cover plate 25 extends out from the channel connection side end 1 like a tongue to, in FIG. 2, the forward head side end of the machine frame base 20 and that the cover plate 25 is positioned on the upper side of the upper cover 23. The edge 25' of the cover plate 25 is provided with a ramp-like incline, which will be explained later.

Figure 3:
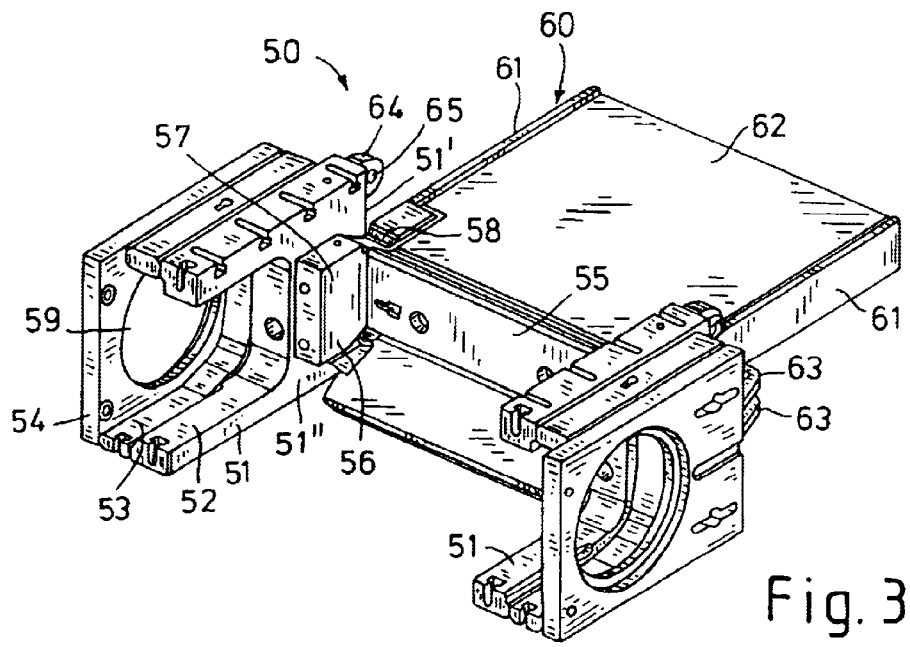
FIG. 3 shows a perspective view of a tensioning frame head.

FIG. 3 shows the tensioning frame head 50, which is movable relative to the machine frame base 20 from FIG. 2 and is guided within it. The tensioning frame head 50 has side cheek plates 51 on its head side, which are provided with window cut-outs 52 open on the head side, into which the basically rectangular bearing housings 7 (FIG. 1) of the chain drum shaft 3 can be slid. On the outer side of the side cheek plates 51 essentially U-shaped intermediate pieces 53 are fastened onto whose outer sides flange plates 54 are attached. The drive set for the chain drum shaft 3 of the chain scraper conveyor can be flanged onto the flange plates 54, optionally on the right and/or the left, as is of itself well known in the state of the technology and therefore not pursued further here. The flange plates 54 have in each case through shaft openings 59, through which the drive set can be joined to the shaft ends of the drum shaft 3 with positive rotational engagement.

The side cheek plates 51 arranged at a distance from each other are strengthened close to the end sides 51', shown at the rear in FIG. 3, of the bearing cheek plates 51 by means of a cross beam 55 to an intrinsically rigid frame. Onto the cross beam 55 the chain deflector 8, shown in FIG. 1, can, inter alia, be fastened, especially screwed on. The cross beam 55 does not abut the mutually facing plate sides 51" of the side cheek plates 51 directly, but engages at the front, preferably with positive and frictional engagement, in the side walls of rail shaped shoulders 56, which have a head piece 57 fastened to the side cheek plates 51 and an extension piece 58 extending out over the channel connection side front sides 51'. A somewhat box shaped drawer 60, whose dimensions are matched to the drawer-like guide 26 in the machine frame base 20 and the inner surfaces of the angle irons 28, 30, so that the drawer 60 and the guide 26 can form a sliding guide for the machine frame base 20 and the tensioning head 50 which can move relative to each other, extends in the centre height level referred to the side cheek plates 51 and extends out horizontally over their front sides 51'. The drawer 60 is formed from two strong rail like bars 61, which can be an integral component of the extension pieces 58 or welded to them or screwed. The bars 61 are again joined together by upper and lower plates 62, so that the drawer 60 is stiffened overall and the can safely withstand the guide forces for moving the tensioning frame head 50 relative to the machine frame base 20. The plates 62 are additionally supported on the cross beam 55 by their head side front sides. The tensioning frame head 50 can, like the machine frame base 20 advantageously be constructed from steel sheet as a welded part.

As already mentioned above, a tensioning drive serves to provide power for the relative movement between the tensioning frame head 50 and the machine frame base 20, which is formed here from two hydraulic tensioning cylinders 6, which are each arranged outside and to the side of the guide 26 and the drawer 60. The tensioning cylinders 6 (FIG. 1) are jointed onto eye bolts 35 in the connecting plates 36 at one end, at the other end to joint plates 63, which form a forked joint and are supported advantageously on the channel connection side front sides of the flange plates 54, intermediate pieces 53 and side cheek plates 51, so that the moving forces are introduced evenly into the tensioning frame head 50.

Two connecting eyes 64 are further fastened on the channel connection side front side 51' of the side cheek plates 51 in each case, for instance welded on, whereby the upper connecting eye 64 in each case is arranged at a distance above the upper plate 62 of the drawer 60 and the lower connecting eye in each case is arranged at a distance below the lower plate of the drawer 60. The connecting eyes 64 in each case have a horizontally arranged bolt eye 65, so that the top run pan 70 shown in FIG. 4 and the bottom run box 40 can be removably fastened by means of retaining bolts 71, 41 in the connecting eyes 64. The top run pan 70 and the bottom run box 40 are parts liable to wear, which should be exchanged at regular intervals. The drive station 10 according to the invention facilitates quick and simple exchange of the bottom run box 40 and the top run pan 70.

Figure 4:
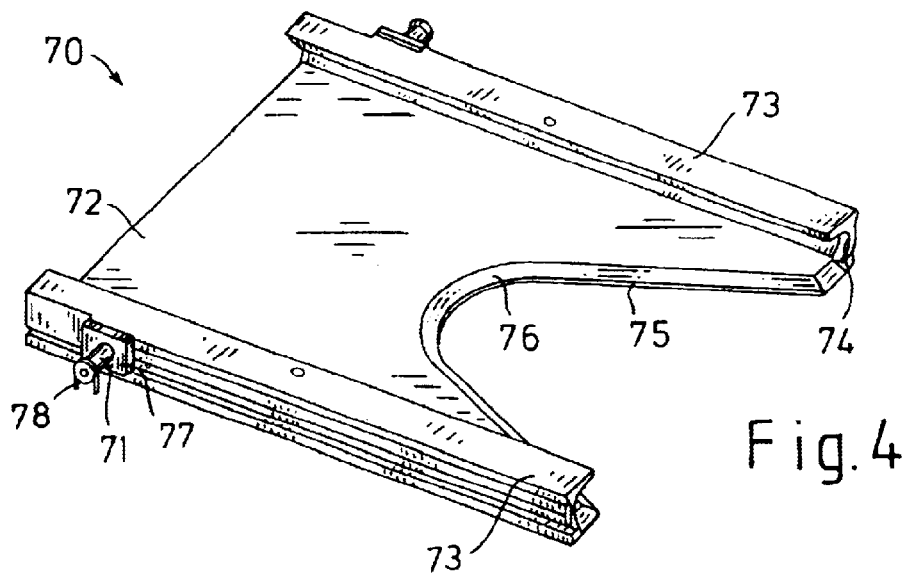
FIG. 4 shows a perspective view of the top run pan.

As FIG. 4 shows, the top run pan 70 has a pan base 72, to whose two longitudinal sides side profiles 73 are welded, whose profile inner surfaces 74 essentially match the scraper chain, not shown, to ensure guidance for the scraper within the top run pan 70. The top run pan 70 forms a drag plate which is supported on the upper side of the webs 32, 38 of the angle irons 28, 30 (FIG. 2) and during tensioning, i.e. movement of the tensioning frame head 50 relative to the machine frame base 20 is moved with it. The top run pan 70 has therefore a tongue shaped cut-out 75, whereby the tongue shaped geometry of the cut-out 75 is matched to the tongue shaped geometry of the cover plate 25 (FIG. 2). With the tensioning frame head 50 fully pushed into the machine frame base 20 the edges 76 of the cut-out 75 and the edges 25' of the cover plate 25 abut directly onto each other. The edges 76 of the cut-out 75 are also provided with a ramp-shaped incline so that with the top run pan 70 and the cover plate 25 pushed together they both lie at somewhat the same height level with the drive station 10 assembled, the ramp shaped inclines of the edges 25' and 76 force out the conveyed material upwards from the lower lying regions of the top run pan, so that it can be transported away using the scrapers of the scraper chain in any case with the drive station pushed together. The ramp shaped inclines at the same time prevent the pushing together being hindered by a back up of conveyed material. The tapering of the tongue shaped swelling in the direction of the tension of the cut-out 75 and the cover plate 25 is advantageously greater than the maximum movement path of the tensioning cylinder 6, so that independently of the tension setting for the scraper chain the scrapers lie either on the upper side of the of the cover plate 25 or on the upper side of the pan base 72. Since the scrapers remain permanently in contact with one of the upper sides their scraping edges do not strike any transfer edges or similar, so that overall the scrapers cause less troublesome noise than was the case with previously used drive stations.

The quick release fastening of the top run pan 70 to the connecting eyes 74 is effected by the pins 71, which for instance are pushed through the bolt eyes 75 in the connecting eyes 64 and anchored in anchor plates 77 which are welded onto the sides of the side profiles 73. The anchoring in the anchor plates 77 can for instance be effected by screwing in or by securing with somewhat U-shaped staples. In the same way the securing of the pins 71 to the connecting eyes 74 can be effected by the schematically indicated plug-in staples 78 which are plugged into borings, not shown, within the connecting eyes 64 and engage by their legs in a groove formed in the pin 71. Alternatively the pins and the anchor plates can be formed as one piece and the connecting eyes have an entry opening or similar for the pins. In the configuration also the securing of the pins in the connecting eyes can preferably be effected by means of plug-in staples.

Figure 5:
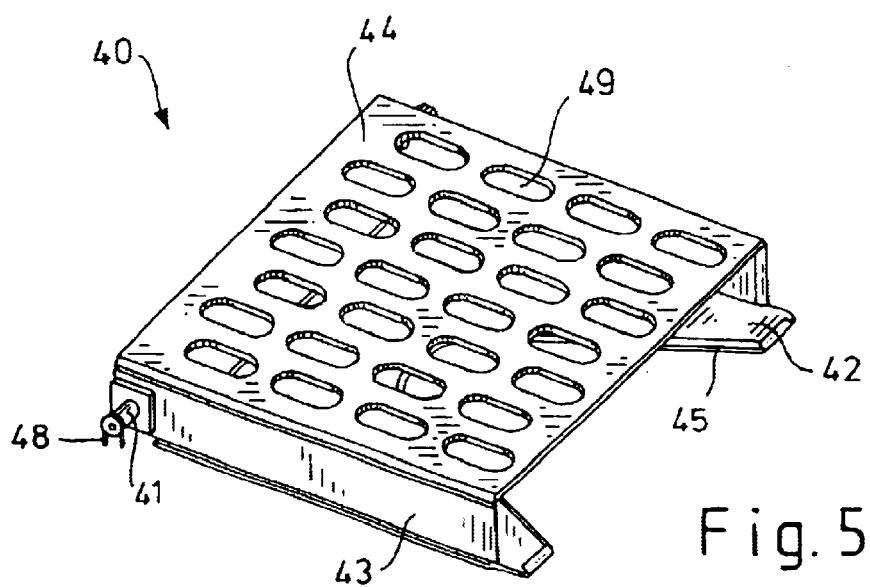
FIG. 5 shows a perspective view of the bottom run box.

The bottom run box 40 is shown in detail in FIG. 5. The bottom run box 40 also moves with the movement of the tensioning frame head 50 in the manner of a drag base and has correspondingly a base plate 42, which is provided with a somewhat tongue shaped cut-out 45 at its channel connecting side end, i.e. the end opposite to push in pins 41. Rail shaped side walls 43 are welded onto the base plate 42 and the box is provided with a cover plate 44 welded onto the rails 43 on the upper side. The cover plate 44 has a multiplicity of somewhat oval openings 49 extending in the direction of movement, through which fine grain material, which collects inside the guide 26 inside the machine frame base 20 can trickle through into the bottom run. The openings 49 in the cover plate 44 of the bottom run box 40 therefore work together with openings 39, here made circular, in the lower cover 24 of the machine frame base 20 (FIG. 2). The easily removable fastening of the bottom run box 40 onto the tensioning frame head 50 is made on the lower connecting eyes on the front ends 51' of the bearing cheek plates 51, which cannot be seen. Preferably the same system is used for the fastening as for the top run pan 70, i.e. here push in pins 41, which are secured by means of push in staples 48. In operation the scraper chains and the scrapers run through the internal space in the bottom run box 40, which is open on both sides. The tongue shaped cut-out 45 works, possibly with a tongue shaped cover plate, such that independently of the tension setting between the machine frame base 20 and the tensioning frame head 50, the scrapers lie optionally on the base plate 42 or the corresponding cover plate.

FIG. 2 further shows that the side cheeks 21 of the machine frame base 20 have a horizontal slit 37 in the rear region, which extends into the guide 26. A spraying and cleaning arrangement having a multi stream water nozzle can be fastened to the eye bolts 38 below the slits 37, which can be connected to the water hydraulics of the face installation. Using the water stream nozzles of the washing device spraying into the guide 26 through the slits 37 coal dust which has penetrated into the guide 26 and has coagulated at the back end, can be freed, so that even after long operating periods of the drive station complete retraction of the tensioning frame head into the machine frame base is assured. The material loosened by the water stream can escape out of the guide 26 via the openings 39 in the lower cover 24 as described above. The cleaning devices arranged on both sides on the side cheeks are of independent inventive significance in telescopic support frames for chain scraper conveyors.

FIG. 1 shows the drive and tensioning station with the assembled top run pan 70 and the assembled bottom run box (hidden by the drum shaft 3) with the tensioning frame head 50 fully pushed into the machine frame base 20. The drawer like guide is completely protected against the ingress of conveyed material. The side profiles 73 of the top run pan 70 lie against the upper webs 32, 38 of the angle irons 28, 30 (cf. FIG. 2) and are guided by the longitudinal rails 33 on their upper sides, so that it is sufficient for the top run pan that it is joined to the tensioning frame head 50 only by the connecting eyes 64. The tensioning cylinders are positioned outside the side cheeks 21 of the machine frame base 20 and lie largely parallel and at the same height as the drawer guide. Disassembly of the chain drum shaft 3 can be effected from the head side. For the exchange of the top run pan 70 either the whole tensioning frame head 50 is loosened from the machine frame base 20 or the long rails 33 are demountable, so that the top run pan 70 can be withdrawn upwards after loosening the push in pin connection.

What is claimed is:

1. A drive and tensioning station of a chain scraper conveyor for mining operations with a machine frame base having side cheeks and a conveyor base, connected to a line of pans of the chain scraper conveyor, with a tensioning frame head which can be moved in the direction of the line of pans, in whose side cheek plates can be mounted the chain drum for the scraper chain, and with a tensioning drive having at least one tensioning cylinder to move the tensioning frame head relative to the machine frame base, in which the tensioning frame head has a box-like drawer extending out over the side cheek plates toward the pan connecting side, which is guided in a type of drawer guide on the machine frame base and in which on the tensioning frame head a top run pan forming a drag plate in the top run or a bottom run box forming a drag base in the bottom run is removably fastened.

2. A drive and tensioning station according to claim 1, in which the side cheek plates of the tensioning frame head are provided in each case with at least two connecting eyes on their front sides on the pan connecting side, onto which the top run pan and the bottom run box are removably fastened by means of push-in or screw in pins.

3. A drive and tensioning station according to claim 2, in which the pins are secured by means of substantially U-shaped push in staples on or in the connecting eyes.

4. A drive and tensioning station according to claim 1, in which the drawer guide includes several U-shaped angle irons fastened in the side cheeks of the machine frame base, preferably exchangeably, whereby the inner surfaces of the angle irons form the guides for sliding the drawer and the upper surfaces of the webs of the angle irons support the top run pan.

5. A drive and tensioning station according to claim 1, in which the drawer guide has a closed upper cover forming the conveyor base and a lower cover preferably provided with openings for the passage of fine grain material.

6. A drive and tensioning station according to claim 1, in which the top run pan has a pan base and side profiles, on whose profile inner surfaces the scrapers of the scraper chain are guided.

7. A drive and tensioning station according to claim 1, in which the side cheeks of the machine frame base are provided with upper longitudinal rails, which form an upper guide for the top run pan and its side profiles.

8. A drive and tensioning station according to claim 1, in which the conveyor base of the machine frame base is provided on the pan connection side with a tongue-shaped cover plate, cut to size, and the top run pan has a corresponding matched tongue-shaped cut-out, whereby the edges of the plate and the cut-out are provided with a ramp-like incline.

9. A drive and tensioning station according to claim 1, in which the bottom run box has an upper cover plate provided with openings for the passage of fine grain material.

10. A drive and tensioning station according to claim 5, in which the openings in the cover plate have a greater extension in the direction of movement than the openings in the lower cover of the drawer guide.

11. A drive and tensioning station according to claim 1, in which the bottom run box has a base plate with a tongue like cut-out on the channel connecting side, whose edges preferably are provided with an incline.

12. A drive and tensioning station according to claim 8, in which the tongue-shaped cut-outs in the top run pan and/or in the bottom run box extend over more than the maximum tensioning distance.

13. A drive and tensioning station according to claim 1, in which on both sides of the machine frame base at least one tensioning cylinder is linked on each side to the side cheek of the machine frame base at one end and at the other end to the side cheek plate of the tensioning frame head, whereby two tensioning cylinders are arranged preferably at the same height level as the drawer guide, or four tensioning cylinders are arranged each symmetrical to the drawer guide.

14. A drive and tensioning station according to claim 8, in which flange plates are arranged outside on the side cheek plates, possibly with the interposition of intermediate plates, onto which a drive set for the conveyor can be fastened, whereby the connecting plates for fastening the tensioning cylinders to the tensioning frame head are supported on the flange plates, on the side cheek plates and possibly on the intermediate plates.

15. A drive and tensioning station according to claim 1, in which washing devices having water stream nozzles are arranged on the side cheek plates, with which any aggregations of fine coal in the drawer guide can be loosened.

16. A drive and tensioning station according to claim 15, in which the side cheek plates are provided with slits, through which the water stream nozzles can spray into the drawer guide.

* * * * *